Patented Nov. 8, 1949

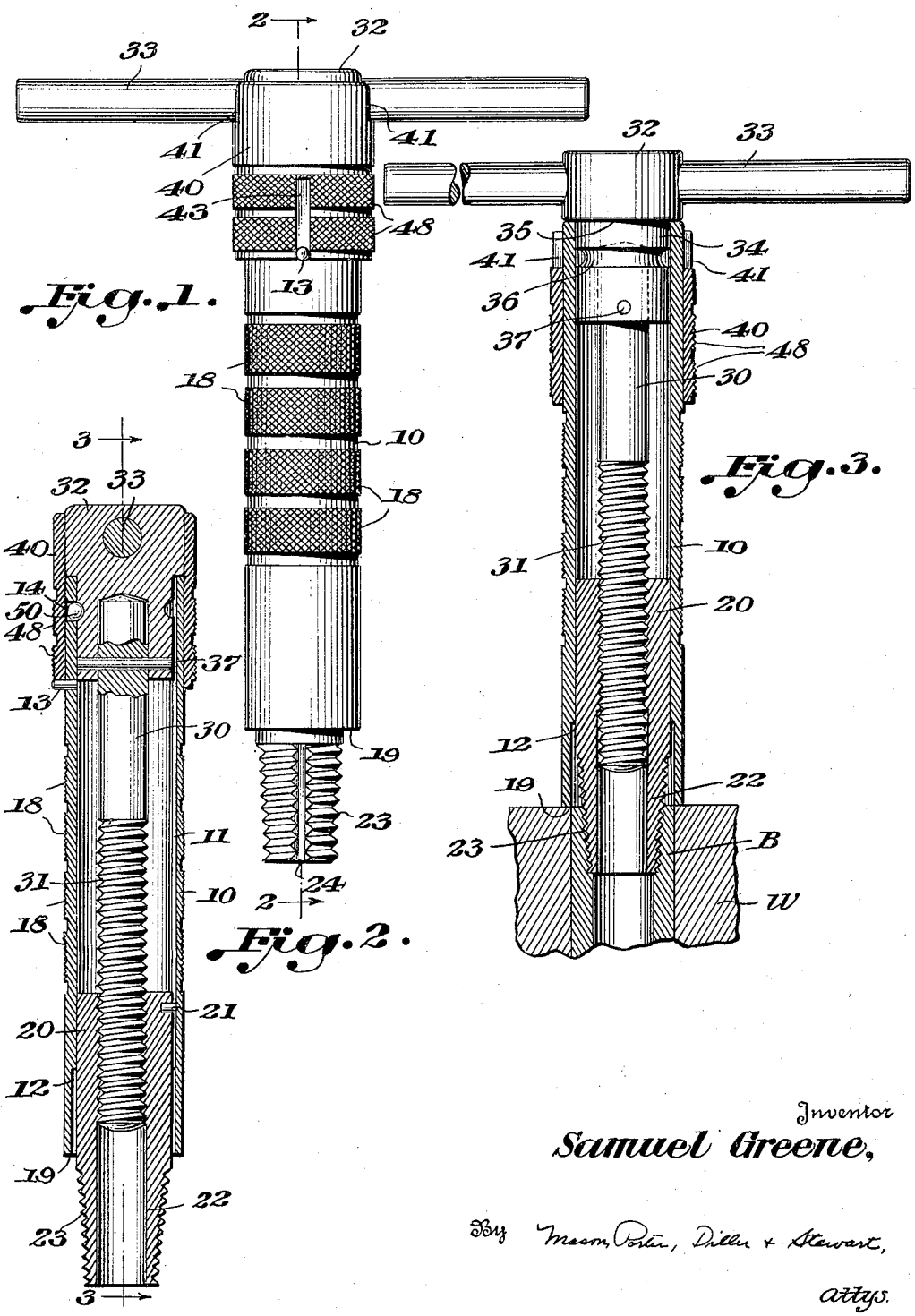

2,487,331

UNITED STATES PATENT OFFICE 2,487,331

BUSHING REMOVER

Samuel Greene, Newark, N. J., assignor to Paragon Products Corporation, Newark, N. J., a corporation of New Jersey Application December 5, 1947, Serial No. 789,992

2 Claims. (Cl. 29—264)

This invention relates to improvements in bushing removers, and is particularly concerned with a self-contained assembly which can be employed for removing bearings and bearing bushings (herein generically termed "bushings").

One of the features of the invention is a compact assembly of parts which may be used in removing such bearings and bearing bushings from either open or blind holes; and in which the more easily damaged structures are protected during storage.

Another feature of the invention is the provision of a simple handle structure, a tool structure, and a clutch piece, which cooperate when engaged to cause the assembly to turn as a unit, and which permit when disengaged a relative rotation of parts for adjustment and for axial movement of the tool with a bushing to be removed.

With these and other features as objects in view, as will appear in the course of the following description, an illustrative form of the invention is shown in the accompanying drawings in which:

Figure 1 is a side elevation of the device, with the handle clutch engaged.

Figure 2 is a longitudinal sectional view, substantially on line 2—2 of Figure 1.

Figure 3 is a longitudinal sectional view substantially on line 3—3 of Figure 2.

In the illustrative form of construction, a sleeve 10 has a longitudinal keyway or spline groove 11 on its internal wall, this internal wall being enlarged near the lower end at a shoulder 12, so that at this end the internal diameter of the sleeve 10 is greater than the external diameter of the largest bushing to be removed. A pin 13 effective as an external lug is secured in the bushing 10 adjacent its upper end; and this upper end of the bushing has a hole 14 between the pin 13 and the end surface of the bushing.

A tool member 20 is slidable within the bushing 10 and has a pin 21 fixed therein and effective as a lug engaged in the spline or keyway 11, so that the tool member 20 is prevented from rotation relative to the sleeve 10, while being permitted relative axial movement. The tool member 20 has a central bore whose wall 22 is threaded at its upper end, and enlarged at least to thread root depth for the rest of its length. Its lower end is tapered externally and provided with the threading 23, these threads being interrupted by axial flutes 24 so that this end of the member 20 is a cutting tap.

A composite rotatable spindle includes the stem 30 having screw threads 31 engaged in the threads of the wall 22 of the tool member 20. A rotatable head-piece 32 receives a transverse handle bar 33 by force-fitting, and has a reduced portion 34 below a shoulder 35, the reduced portion 34 fitting and being rotatable within the sleeve 10, while the shoulder 35 bears against the upper end of the sleeve 10. The reduced portion 34 has a peripheral groove 36. A diametrical pin 37 passes through the reduced portion 34 and the stem 30, and compels these parts to turn together.

A clutch sleeve 40 is mounted externally for sliding motion on the sleeve 10 and is provided with the two diametrically opposed notches 41 which in the raised position (Figures 1 and 2) of the clutch sleeve 40 engage the handle 33 so that rotation of this handle about the axis of the assembly compels turning of the clutch sleeve 40. The sleeve 40 has an axially directed notch 43 extending from its lower edge and having its walls engaged with the pin 13 of the sleeve 10 (Figure 1) so that the sleeves 10 and 40 must turn together. The axial length of the notch 43 is greater than the axial movement of the clutch sleeve 40, so that the pin 13 is always within the notch after assembly.

An assembly ball 50 is located in the hole 14 of sleeve 10 and projects into the groove 36 of reduced portion 34 while engaging the inner surface of the clutch sleeve 40. This ball 50 serves to prevent relative axial movement of the spindle and the main sleeve 10, while permitting relative rotation. By design, the ball 50 is larger than the peripheral width of the notch 43.

For convenient operation of the parts, particularly when the hands may be oily or greasy from the work being done, it is preferred to provide the sleeve 10 with knurled rings 18, and to provide the clutch sleeve 40 with corresponding knurled rings 48 (Figure 1).

The structure may be assembled by connecting the stem 30 with the head-piece 32, 34 by the pin 37, which may have a driven fit. The tool member 20 may then be engaged with the threaded portion 31 and this sub-assembly slipped into the sleeve 10, with care to engage the pin 21 in the keyway or spline 11. The ball 50 is inserted in hole 14. The clutch sleeve 40 is then slipped over the head-piece 32 and onto the upper end of sleeve 10, wherewith the notch 43 receives the pin 13. The handle 33 is then forced into the head-piece 32, thus confining the clutch sleeve 40 between the handle 33 and the pin 13 which, respectively, limit the movements thereof relative to the sleeve 10.

The operation of withdrawing a bushing with the tool begins by moving the clutch sleeve 40 along the main sleeve 10 toward the lower end thereof, thus freeing the head-piece 32 with handle 33 for rotation within the sleeve 10. The handle is now rotated until the tap end 23, 24 of the tool member 20 projects beyond the lower end of the sleeve 10, e. g. into the position shown in Figure 3. The clutch sleeve 40 is now slid upwardly and engaged with the handle 33, with the position as shown in Figures 1 and 2. The tap 23, 24 is introduced into the open end of the bushing to be removed, for example, the bushing B in Figure 3, which is present with a driven fit in the wall W. The structure is rotated about its axis by the handle 33. The threads 23 of the tap cut their way into the bushing B; in usual practice this cutting operation, with endwise movement of the tool structure, continues until the lower end face 19 of the sleeve 10 is in contact with the structure W at areas outside the end of the bushing B. This engagement prevents any further axial advancement of the tool structure, while continued rotational pressure on the handle 33 will cause the main sleeve 10 to bind firmly to the structure W, and may cause the bushing B to rotate in the structure W. This latter is sometimes advantageous, where possible, in freeing a bushing B of circular-cylindrical shape.

When the end surface 19 has engaged the body W, the clutch sleeve 40 is slid relatively downward again, into the position shown in Figure 3. This disengages the handle 33, with head-piece 32 and stem 30, and rotation by the handle 33 can now occur without rotation of the clutch sleeve 40 or the main sleeve 10. Since the tool member 20 is held against rotation relative to the sleeve 10 by the action of the pin 21, the further rotation of the structure by the handle 33, in the same direction as before (clockwise when threads 31 and 23 are right-hand), will produce a rotation of the threads 31 within the tool member 20, and the tool member 20 is drawn upward axially by forces occurring between the thread 31 and the threaded wall 22 of the tool member 20, with reaction between the shoulder 35 of head-piece 32 and the upper end of sleeve 10, thence along the length of this sleeve 10 and from its lower end surface 19 against the structure W. The continued movement of the handle 33 thus causes an axial pulling of the bushing B until it is drawn into the sleeve 10 and the tool structure can be removed from the work structure W.

A reverse rotation by the handle 33 now causes the tool member 20 to move outward again, thus exposing the withdrawn bushing B, so that this may be unscrewed from the tap threads 23.

When the tool member 20 has thus been moved downward, it is in position for removing a further bushing. However, in carrying or storing the tool structure, it is preferred to withdraw the tool member 20 within the sleeve 10, to prevent damage to the tap threads 23.

It is obvious that the invention is not limited to the specific structure illustrated, and that it may be employed in many ways within the scope of the appended claims.

I claim:

1. A bushing remover comprising a main sleeve, a tool member axially slidable in the main sleeve, interengaging parts on the main sleeve and tool member for preventing relative rotation, a spindle including a head-piece and a threaded stem, said tool member having internal threading engaged with the stem, said head-piece including a shoulder engaged with the main sleeve and a part projecting radially beyond the main sleeve, a clutch sleeve slidable axially along said main sleeve and having a notch at one edge engaged in one slid position with said projecting part of the head-piece and being free thereof in another slid position, and interengaging parts on the said sleeves for preventing relative rotation.

2. A bushing remover comprising a threaded stem, a head-piece secured to said stem and having a shoulder, a main sleeve surrounding the stem and engaged with said shoulder; said sleeve having an internal axial keyway, an externally projecting first lug, and a hole opposite a part of the head-piece, said head-piece having a peripheral groove aligned with said hole, a ball in said hole and groove; a tool member slidable in said main sleeve and having a second lug engaged in said keyway; a handle bar extending from the head-piece in a radial direction; an external clutch sleeve around the main sleeve and slidable therealong and effective to maintain said ball in position, said clutch sleeve having notches in its edges, a said notch on one edge thereof having its walls engaging said first lug, another said notch on the other edge thereof being engageable with said handle in one slid position of the clutch sleeve and being free thereof in another slid position.

SAMUEL GREENE.

REFERENCES CITED

The following references are of record in the file of this patent:

UNITED STATES PATENTS

| Number | Name | Date |
|---|---|---|
| 931,551 | Adams et al. | Aug. 17, 1909 |
| 1,510,291 | Alexander | Sept. 30, 1924 |
| 1,589,862 | Ouint | June 22, 1926 |
| 2,234,824 | Kingston | Mar. 11, 1941 |
| 2,257,089 | Caminez | Sept. 30, 1941 |